(12) United States Patent
Beeler

(10) Patent No.: US 8,472,440 B2
(45) Date of Patent: Jun. 25, 2013

(54) SYSTEMS AND METHODS FOR DETERMINING PACKET ERROR RATE (PER) FOR WIRELESS ENCAPSULATED NETWORK PACKET DATA COMMUNICATIONS LINKS

(75) Inventor: Michael Beeler, Jefferson, MD (US)

(73) Assignee: Comtech EF Data Corp., Tempe, AZ (US)

( * ) Notice: Subject to any disclaimer, the term of this patent is extended or adjusted under 35 U.S.C. 154(b) by 179 days.

(21) Appl. No.: 13/101,710

(22) Filed: May 5, 2011

(65) Prior Publication Data

US 2011/0211460 A1 Sep. 1, 2011

Related U.S. Application Data

(60) Provisional application No. 61/415,394, filed on Nov. 19, 2010.

(51) Int. Cl.
*H04L 12/28* (2006.01)

(52) U.S. Cl.
USPC .......................... 370/389; 370/471; 370/473

(58) Field of Classification Search
USPC ................... 370/432, 471, 473, 395.64, 389
See application file for complete search history.

(56) References Cited

U.S. PATENT DOCUMENTS

| 6,441,782 B2 * | 8/2002 | Kelly et al. | 342/359 |
| 2006/0253763 A1 * | 11/2006 | Oliva et al. | 714/746 |

* cited by examiner

*Primary Examiner* — Brenda H Pham
(74) *Attorney, Agent, or Firm* — Booth Udall Fuller, PLC

(57) ABSTRACT

A method for generating a packet sequence for determining a Packet Error Rate (PER) using network packets, the method comprising generating, using a Local Area Network (LAN) enabled computer, a series of network PER test packets and frames, each packet comprising a predetermined unique identifier and each frame comprising a predetermined sequence for the packets in the series of network packets, wherein the series of network packets and frames are each of a size that is compliant with a predetermined framing mode and encapsulation protocol for the transmission system for determining a PER from the series of network packets and frames, and transmitting, using a transmitting device, the network packets and frames to a receiving device.

16 Claims, 9 Drawing Sheets

SYSTEMS AND METHODS FOR DETERMINING PACKET ERROR RATE (PER) FOR WIRELESS ENCAPSULATED NETWORK PACKET DATA COMMUNICATIONS LINKS

CROSS REFERENCE TO RELATED APPLICATIONS

This document claims the benefit of the filing date of U.S. Provisional Patent Application No. 61/415,394, entitled "Systems and Methods for Determining Packet Error Rate (PER) for Wireless Encapsulated Network Packet Data Communications Links" to Michael Beeler, which was filed on Nov. 19, 2010, the disclosure of which is hereby incorporated entirely by reference herein.

BACKGROUND

1. Technical Field

Aspects of this document relate generally to telecommunication systems and techniques for transmitting data across a telecommunication channel.

2. Background Art

Since the introduction of digital communications, determining the error rate (ER) of a link is crucial for determining the "goodness" of a link. For wireless communications links that carry network packet data such as, but not limited to the Internet Protocol (IP), Internetwork Packet Exchange (IPX), or NetBIOS Extended User Interface (NetBEUI), etc., determining the ER is critical to understanding the required power or energy for the wireless communications link to guarantee an established level of operation to satisfy desired level of service to the end user.

For wireless communications, such as, but not limited to, satellite communications, an established ER may be obtained using a specific antenna configuration and combined amplifier(s) to achieve a particular power level though the link. In the art, a "link budget" may be performed to establish the required antenna size and power amplification devices, each resulting in gain. This combined gain results in a total gain applied to a signal to compensate for path loss (resulting in attenuation) to the signal to ensure that the signal arrives at the destination with enough energy to provide a known level of correct packets versus erroneous packets. The result is an ER that is acceptable for operation at the established service level agreement required for the link.

In the art, the ER versus the power is known as an ER curve. Traditionally, bit transmission systems utilize a Bit Error Rate (BER) versus required power, but with the introduction of frame and packet based systems that use forward error correction (FEC) codes over the transmission frames or packets, the focus has moved away from BER and has been more focused on Packet Error Rate(PER).

For wireless satellite communications, the introduction of the Digital Video Broadcasting Satellite-Second Generation (DVB-S2), as specified in European Telecommunications Standards Institute (ETSI) EN 302 307, has solely focused on a transmission scheme that is packet based instead of bit based. Therefore, all performance of the transmission scheme is measured in PER versus power instead of the traditional BER performance as was specified in the first generation of DVB-S, as noted in ETSI EN 300 421.

Knowing the type of encapsulation allows the method, whether using internal or external network packet data as stimulus, to be utilized to ascertain the PER of the transmission link. Thus, a need exists for a method that allows one to determine the PER of a given link thereby resulting in the accomplishment of the creation of PER versus power curves and/or performance.

SUMMARY

Implementations of a method for generating a packet sequence for determining a Packet Error Rate (PER) using network packets may comprise generating, using a Local Area Network (LAN) enabled computer, a series of network PER test packets and frames, each packet comprising a predetermined unique identifier and each frame comprising a predetermined sequence for the packets in the series of network packets, wherein the series of network packets and frames are each of a size that is compliant with a predetermined framing mode and encapsulation protocol for the transmission system for determining a PER from the series of network packets and frames and transmitting, using a transmitting device, the network packets and frames to a receiving device.

Particular implementations may comprise one or more of the following features. The method may further comprise identifying the packet and sequence number of the packet using encoded data. The method may further comprise determining an integrity of data within the packet using encoded data. The framing mode may be ISO/IEC 13818-1 Moving Picture Expert Group 2 (MPEG 2) 188-byte transport stream framing. The encapsulation protocol may be ETSI EN 301 192 Multiprotocol Encapsulation (MPE). The framing mode may be ETSI EN 307 DVB-S2 base-band framing. The encapsulation protocol may be Generic Stream Encapsulation (GSE). The encapsulation protocol is Ultra-Lightweight Encapsulation or Unidirectional Lightweight Encapsulation (ULE). The method may further comprise notifying the transmitting device of available bandwidth in an encapsulation payload within which an additional LAN enabled payload is carried.

Implementations of a method for receiving a framing sequence and determining a Packet Error Rate (PER), may comprise receiving PER test data as a series of network packets and frames using a receiving device, the network packets and frames formed prior to transmission to comprise a size that is compliant with a predetermined framing mode and encapsulation protocol for the transmission system for determining a PER from the series of network packets and frames and determining the PER for the series of network packets and frames received using a Local Area Network (LAN) enabled interface by comparing a received packet sequence and received packet identifications of the PER test data with a predetermined unique identifier for each of the network packets and a predetermined sequence for the network packets.

Particular implementations may comprise one or more of the following features. he method may further comprise uniquely identifying the network packet for the received PER test data and determining its packet sequence number using encoded data. The method may further comprise determining an integrity of the received data within the network packet using the encoded data. The method may further comprise determining whether a network packet is missing using the sequence number. The method may further comprise determining whether a network packet is a duplicate network packet using the sequence number. The method may further comprise determining whether a network packet is out of sequence using the sequence number. The framing mode may be ISO/IEC 13818-1 Moving Picture Expert Group 2 (MPEG 2) 188-byte transport stream framing. The encapsulation protocol may be ETSI EN 301 192 Multiprotocol Encapsulation (MPE). The framing mode may be ETSI EN 302 307 DVB-S2 baseband framing. The encapsulation protocol may be Generic Stream Encapsulation (GSE). The encapsulation protocol may be Ultra-Lightweight Encapsulation or Unidirectional Lightweight Encapsulation (ULE). The method may further comprise determining an accounting of received network packets using a processing device. The method may further comprise determining a number of received non-errored, errored, missing, or out of sequence network packets received in a pre-determined time period. The method may further comprise storing the accounting of received network packets in a memory. The method may further comprise processing the accounting data such that the data may be plotted or graphed. The PER may be determined without using an interface for raw transport frames.

Implementations of a system for generating a packet sequence for determining a Packet Error Rate (PER) using network packets may comprise a Local Area Network (LAN) enabled computer configured to generate a series of network PER test packets and frames, each packet comprising a predetermined unique identifier and each frame comprising a predetermined sequence for the packets in the series of network packets, wherein the series of network packets and frames are each of a size that is compliant with a predetermined framing mode and encapsulation protocol for the transmission system for determining a PER from the series of network packets and frames and a transmitting device configured to transmit the network packets and frames to a receiving device.

Particular implementations may comprise one or more of the following features. The LAN enabled computer may be further configured to identify the packet and sequence number of the packet using encoded data. The LAN enabled computer may be further configured to determine an integrity of data within the packet using encoded data. The framing mode may be ISO/IEC 13818-1 Moving Picture Expert Group 2 (MPEG 2) 188-byte transport stream framing. The encapsulation protocol may be ETSI EN 301 192 Multiprotocol Encapsulation (MPE). The framing mode may be ETSI EN 307 DVB-S2 base-band framing. The encapsulation protocol may be Generic Stream Encapsulation (GSE). The encapsulation protocol may be Ultra-Lightweight Encapsulation or Unidirectional Lightweight Encapsulation (ULE). The transmitting device may be further configured to receive notification of available bandwidth in an encapsulation payload in which additional LAN enabled payload is carried.

Implementations of a system for receiving a framing sequence and determining a Packet Error Rate (PER) may comprise a receiving device configured to receive PER test data as a series of network packets and frames, the network packets and frames formed prior to transmission of the network packets and frames to comprise a size that is compliant with a predetermined framing mode and encapsulation protocol for the transmission system for determining a PER from the series of network packets and frames and a Local Area Network (LAN) enabled interface configured to determine the PER for the series of network packets and frames received by comparing a received packet sequence and received packet identifications of the PER test data with a predetermined unique identifier for each of the network packets and a predetermined sequence for the network packets.

Particular implementations may comprise one or more of the following features. The LAN enabled interface may be further configured to uniquely identify a network packet and determine a sequence number of the network packet using encoded data. The LAN enabled interface is further configured to determine an integrity of the received data within the network packet using the encoded data. The LAN enabled interface is further configured to determine whether a network packet is missing using the sequence number. The LAN enabled interface may be further configured to determine whether a network packet is a duplicate network packet using the sequence number. The LAN enabled interface may be further configured to determine whether a network packet is out of sequence using the sequence number. The framing mode may be ISO/IEC 13818-1 Moving Picture Expert Group 2 (MPEG 2) 188-byte transport stream framing. The encapsulation protocol may be ETSI EN 301 192 Multiprotocol Encapsulation (MPE). The framing mode may be ETSI EN 302 307 DVB-S2 baseband framing. The encapsulation protocol may be Generic Stream Encapsulation (GSE). The encapsulation protocol is Ultra-Lightweight Encapsulation or Unidirectional Lightweight Encapsulation (ULE). The LAN enabled interface may be further configured to determine an accounting of received network packets using a processing device. The LAN enabled interface may be further configured to determine a number of received non-errored, errored, missing, or out of sequence network packets received in a pre-determined time period. The LAN enabled interface may be further configured to store the accounting of received network packets in a memory. The LAN enabled interface may be further configured to process the accounting data such that the data may be plotted or graphed. The PER may be determined without using an interface for raw transport frames.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Description, Drawings, or Claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, encapsulation types, or methods disclosed herein. Many additional components and assembly procedures known in the art consistent with determining Packet Error Rate (PER) for wireless encapsulated network packet data communications links are in use with particular implementations from this disclosure. Accordingly, for example, although particular implementations are disclosed, such implementations and implementing components may comprise any components, models, versions, quantities, and/or the like as is known in the art for such systems and implementing components, consistent with the intended operation.

This disclosure relates to a method for determining the Packet Error Rate (PER) for encapsulated network packet data capable wireless communications links. The term PER relates to the ratio of errored or missing packets verses the total number of transmitted packets over a communications link.

Particular implementations of determining Packet Error Rate (PER) for wireless encapsulated network packet data communications links disclosed herein may be specifically employed in satellite communications systems. However, as it will be clear to those of ordinary skill in the art from this disclosure, the principles and aspects disclosed herein may readily be applied to any electromagnetic (IF, RF and optical) communications system, such as cellular phone or terrestrial broadcast network without undue experimentation.

This disclosure relates to, but is not limited to, determining Packet Error Rate (PER) for wireless encapsulated network packet data communications links. The methods disclosed herein remove the need for special error rate test equipment or synchronous interfaces associated with BER test equipment. As disclosed herein, implementations of the methods use native packet encapsulation techniques to determine the PER for a given network. These implementations support either ER stimulus that is generated externally or internally to the system for determining the PER of a link. Particular implementations described herein may use, but are not limited to, Field-Programmable Gate Arrays (FPGA), Programmable Logic Devices (PLD), Programmable Integrated Circuits (PIC), Digital Signal Processors (DSP), Application Specific Integrated Circuits(ASIC) or microprocessors.

Particular implementations of the described methods and systems apply to wireless satellite communications, but the technology described is not limited to satellite communications. By knowing the optimal payload size of the data for an encapsulated system, and setting the data to an appropriate size to completely fill the transport payload size, one may determine the PER for the transmission network.

Figure 1:
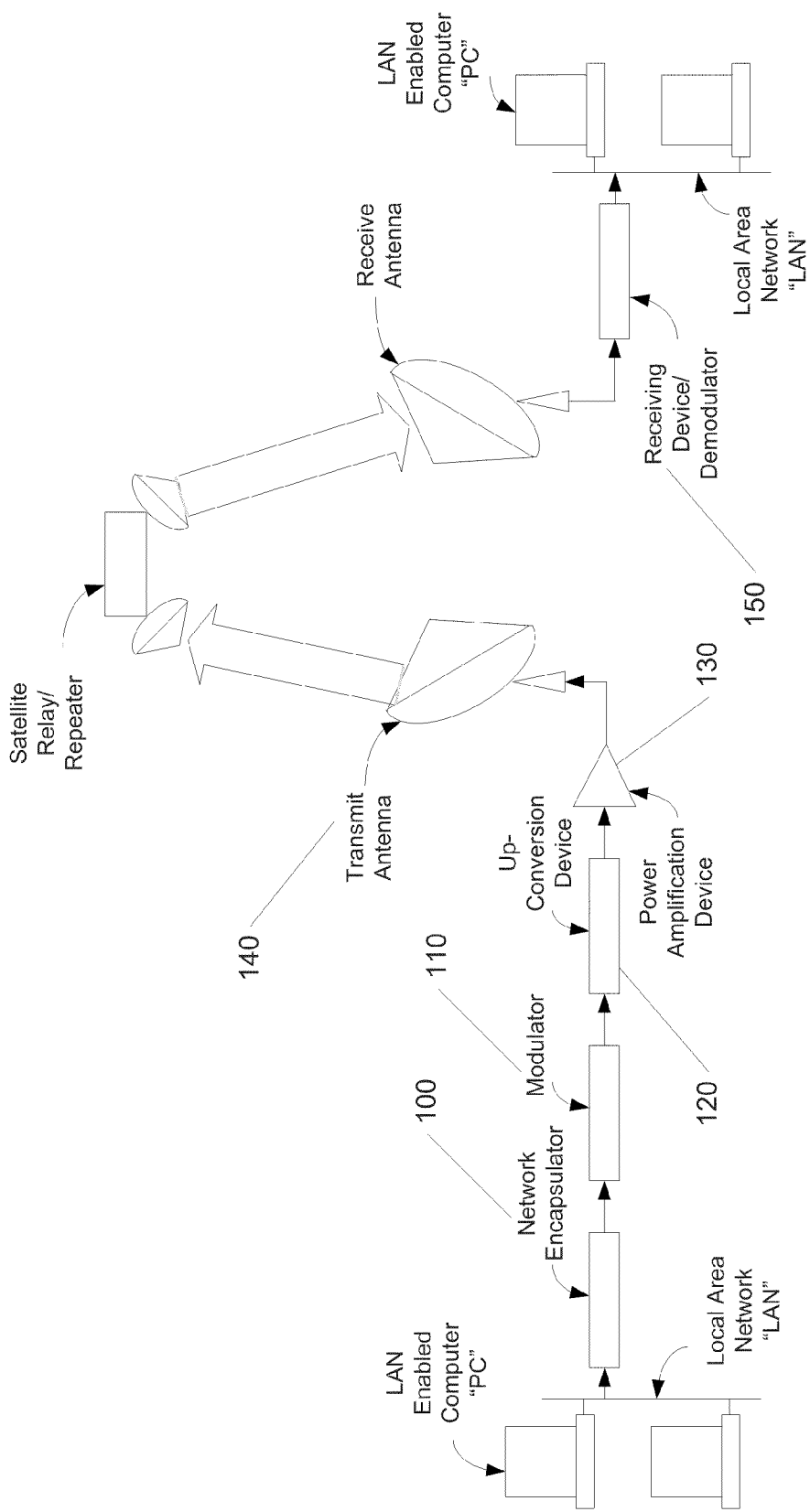
FIG. 1 depicts an implementation of a wireless satellite network using encapsulation technology for carrying communications data.

FIG. 1 demonstrates a non-limiting packetized wireless satellite communications network that uses DVB-S technology using International Organization/International Electrotechnical Commission (ISO/IEC) using the ISO/IEC 13818-1 MPEG 2 Transport Stream with ETSI EN 301 192 DVB specification for data broadcasting Multi-Protocol Encapsulation (MPE) for carrying network packets over a satellite link which is an example of a typical wireless satellite network supporting encapsulated data transmission between two remotely-distributed communications locations where network data packets are received at a transmission site and forwarded to an encapsulating device 100 where the network packet data is packetized as an MPE packet and then framed as a 188-byte MPEG 2 transport stream for transmission over the wireless satellite link. One of ordinary skill in the art would recognize that the term network data protocol is synonymous with IP, IPX, NetBEUI, etc., which are carried over a Local Area Network (LAN) for local (interfacility) communications. The encapsulation of data into a wireless network allows the data introduced into the network to be abstracted from the internal, packetized-transport layer. As shown, the encapsulating device 100 encapsulates the network data packet in an encapsulation format and then frames the encapsulation packet for prior to modulation 110, up-conversion 120, power amplification 130, and transmission by a transmit antenna 140 over the wireless satellite link. At the receiving site 150, the framed packet is received, de-encapsulated, and forwarded as a network packet to the LAN for delivery.

Figure 2:
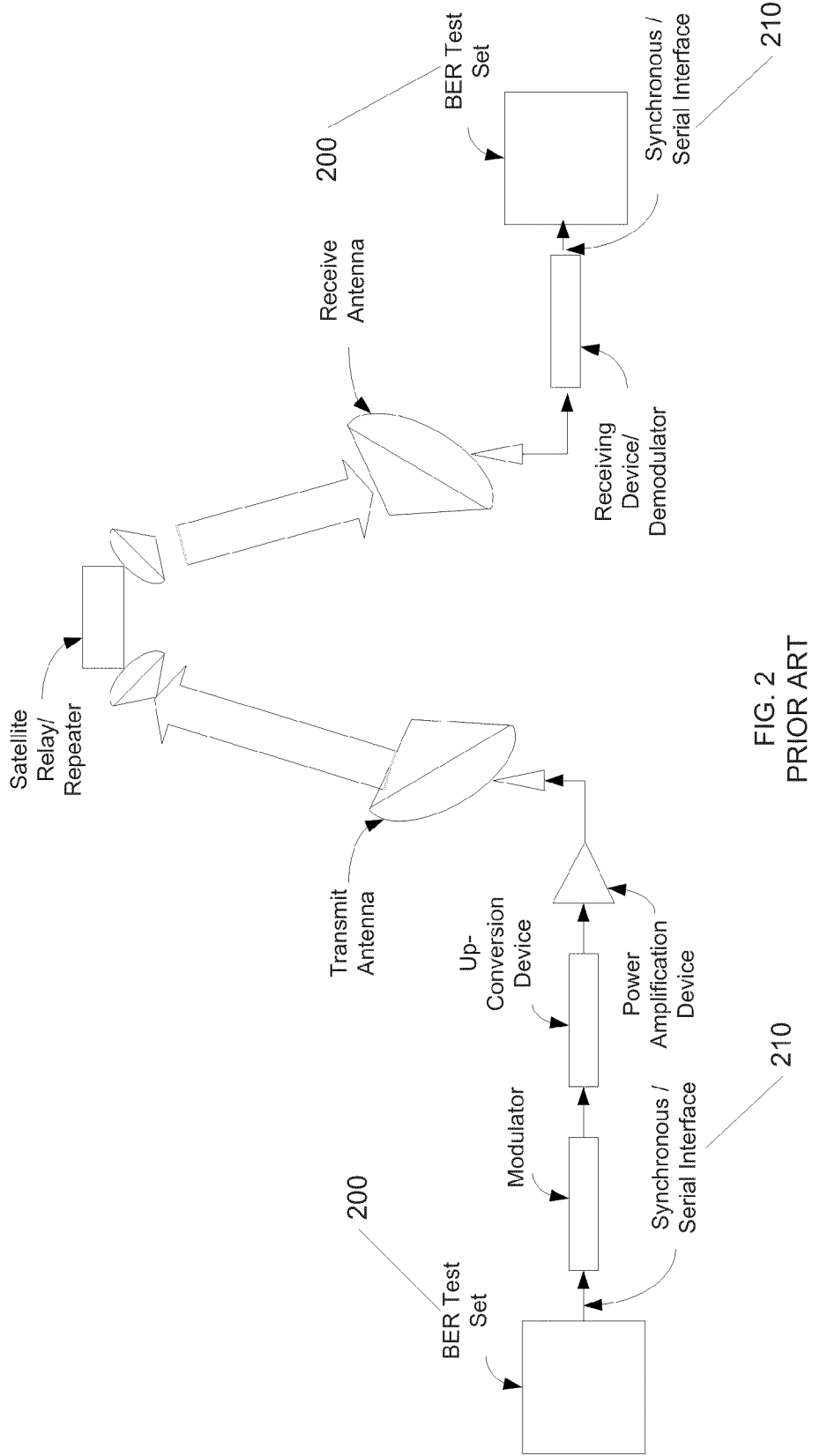
FIG. 2 is a representation of the prior art for determining the error rate of a network.

FIG. 2 shows how the ER, namely the BER, is obtained in the prior art for non-LAN enabled links. External devices must be connected to the transmission gear via synchronous connections such as Telecommunications Industry Association (TIA) Recommended Standard-232 (RS-232) unbalance serial communications, RS-422 balanced serial communications, or European Standard (EN-50083-9) Asynchronous Serial Interfaces (ASI) operating over a synchronous 270 Mbps interface. In many instances, the RS-232, RS-422, ASI, etc. interfaces may not be available on the wireless satellite equipment. As shown, the external BER tester (BERT) 200 requires a synchronous interface 210 such as, for example, a bit serial interface such as RS-232 (unbalanced serial interface (balanced serial interface) or Asynchronous Serial Interface (ASI) running at 270 Mbps supporting a native transport stream format to interface to the wireless network equipment. In these configurations, external test equipment 200 must be present on both the transmitting and receiving side of the link. A known pattern is injected at a pre-determined rate and transmitted over the wireless satellite link to verify the BER of the link. In another embodiment, synthetic BER data may be injected by the transmission equipment into the wireless satellite link and extracted by the receiving device and an end-to-end BER may be obtained.

Figure 3:
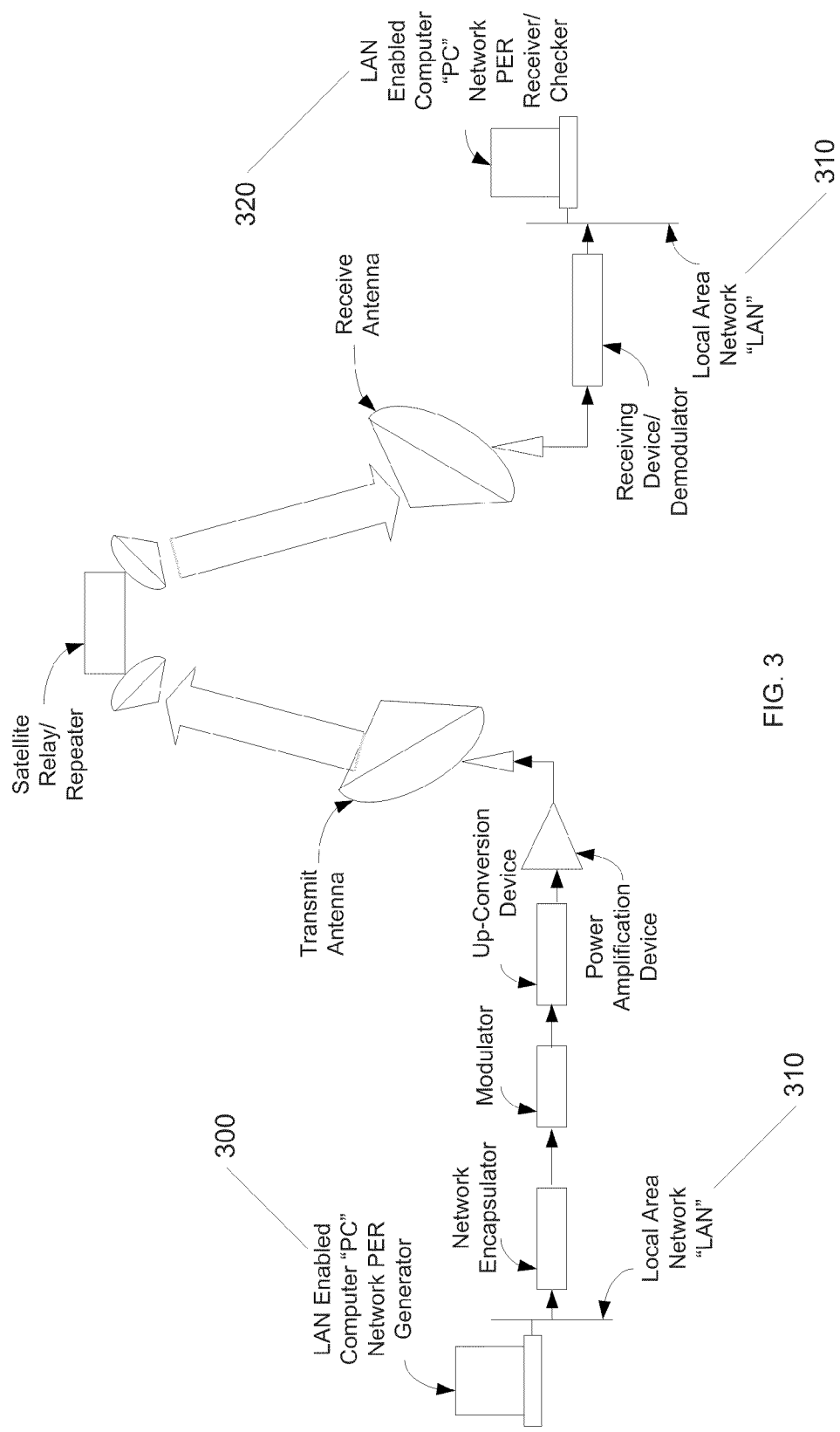
FIG. 3 depicts and implementation of a method in which external LAN network packet data is a stimulus for a PER test.
Figure 4:
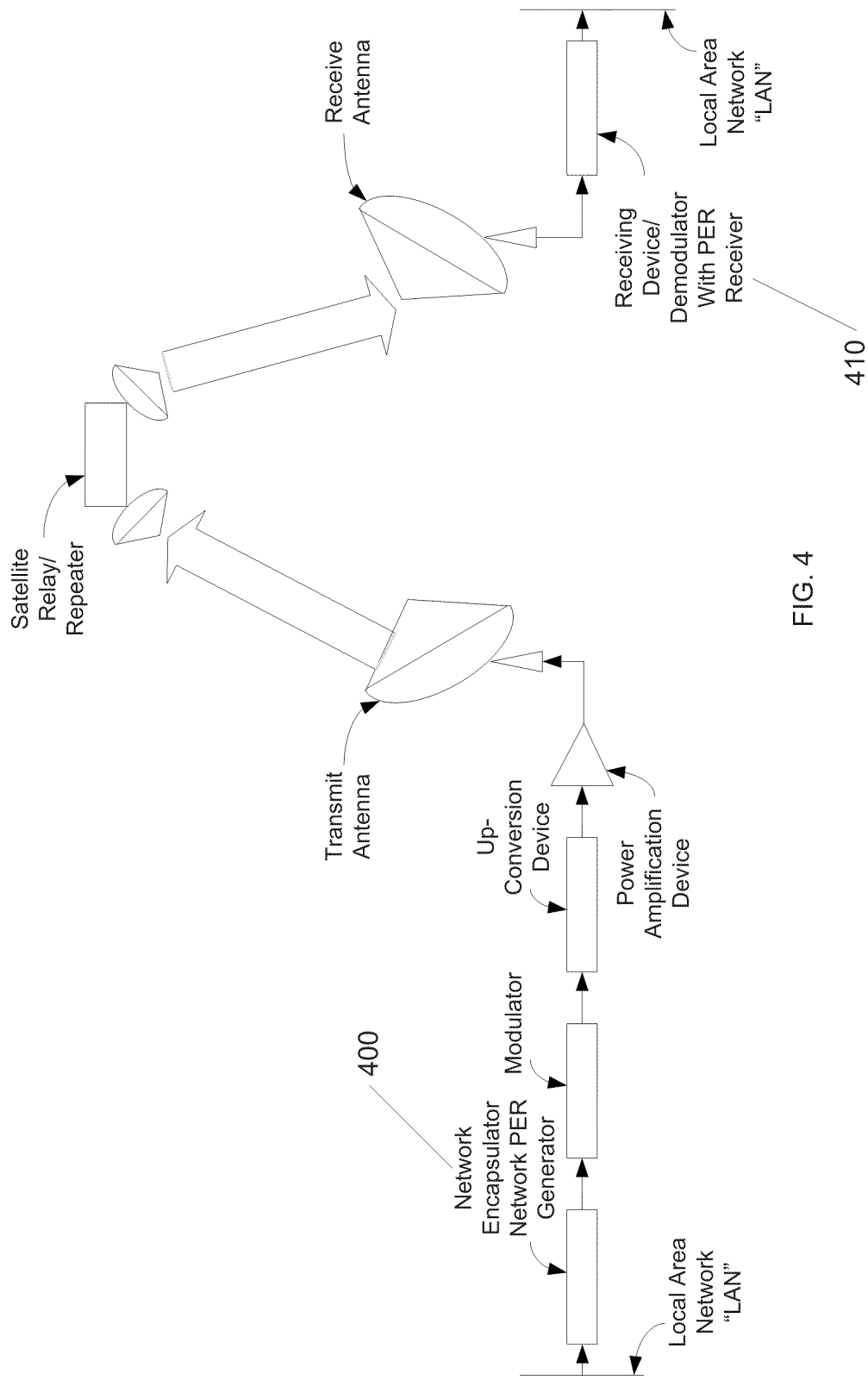
FIG. 4 depicts and implementation of a method in which internally generated network packet data is a stimulus for a PER test.

FIG. 3 demonstrates how the methods described herein may be used to obtain the PER of a link using common network enabled transmission equipment. There is no need for use of special equipment or interfaces to take advantage of the described method. More specifically, FIG. 3 shows how the described method may be used for external stimulus to determine the PER of the network using externally generated 300 network packet data for the determination of the PER. As shown, the methods described herein may be used with a native Local Area Network (LAN) input interface 310 between the transmitting device, over the link and output at the receiving device to externally determine 320 the PER of the end-to-end network. Implementations of these methods may operate the same for both external stimuli 300 as for internally generated (synthetic) error rate data as shown in FIG. 4 in which the network PER generator 400 and PER receiver 410 are internal to the system. The network data packets (internal or external) used for the error patterns are fed into the payload of the network data packets and may be fixed (a priori) bit or byte sequences, self-synchronizing PRN sequences, sequential count sequences, or any other sequence known to one of ordinary skill in the art.

The methods described in this disclosure may employ digital signal processing (DSP) techniques such as, but not limited to, encapsulation, framing and packetization techniques which can easily be implemented in Field-Programmable Gate Arrays (FPGA), Programmable Logic Devices (PLD), Programmable Integrated Circuits (PIC), Digital Signal Processors (DSP), Application Specific Integrated Circuits (ASIC) or microprocessors using conventional implementation methods known in the art by those with knowledge of this disclosure.

Figure 9:
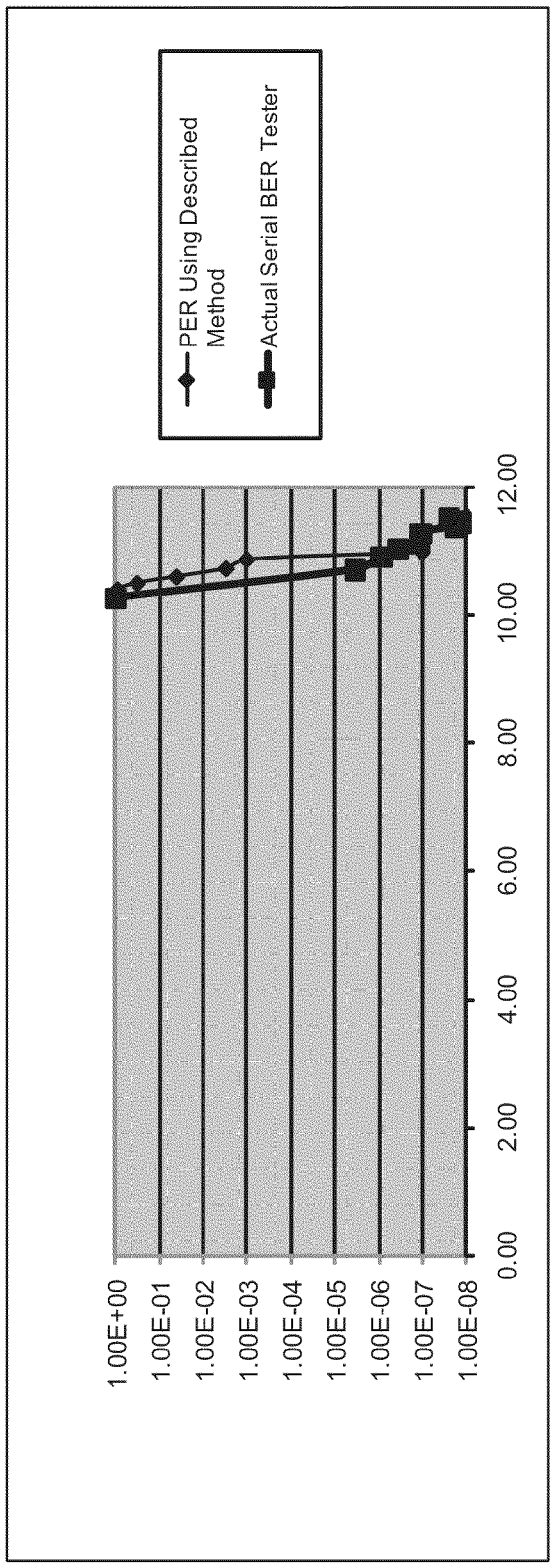
FIG. 9 is a graph of the results of comparing a synchronous PER tester (prior art) versus an implementation of a LAN enabled described method.

The need to determine the error rate (ER) performance of a network is critical to ensure proper operation. For wireless networks, the ER performance is directly related to the power of the signal as it is received at the distant end. In the art, the error rate performance as a function of the power and/or energy is plotted in a chart known as an error rate curve. The vertical axis or "Y-axis" contains the ER performance, represented as "BER" or "PER," and the horizontal axis or "X-axis" contains either the bit energy over the noise density of the system, represented as Eb/No, or symbol energy over the noise density of the system, represented as Es/No in decibels. A decibel is a power rating expressed as 10*Log 10(X) of the ratio of symbol energy (Es) over the noise density (No) or (Es/No)dB. The Es/No ratio is expressed in dB using 10 Log 10(Es/No). An example of the PER verses (Es/No)dB curve is shown in FIG. 9. Knowing the error rate performance as a function of the available energy allows one to know the overall performance of the system. In the art, a "link budget" is used in conjunction with ER curves to arrive at the expected ER performance based on the available power/energy and path losses to determine the appropriate system components that are required to meet the desired performance of a network. In a typical wireless transmission network, some level of error checking (EC) and forward error correction (FEC) may be performed. For links with FEC, the link may be operated as a less than perfect link (containing bit errors) and still provide a nearly error free link, known in the art as Quasi-Error Free (QEF), where the low-level link may be taking errors, but the higher-level link is running error free due to the FEC making corrections to the erroneous bits as they are received. For DVB-S (as specified in ETSI EN 300 421) the QEF point is considered to be a "BER" of 1E-10. However, for DVB-S2 (as specified in ETSI EN 302 307) the QEF point is considered to be a "PER" of 1E-7, but it is noteworthy to state a PER of 1E-7 is approximately the same as a BER of 1E-10, since an MPEG 2 transport frame is considered to be 188 bytes in length with 8 bits per byte provides: 1E7 packets*8 bits/byte*188 bytes/frame=1.5E10 bits, and one packet is equivalent to one MPEG 2 transport stream frame.

Figure 5:
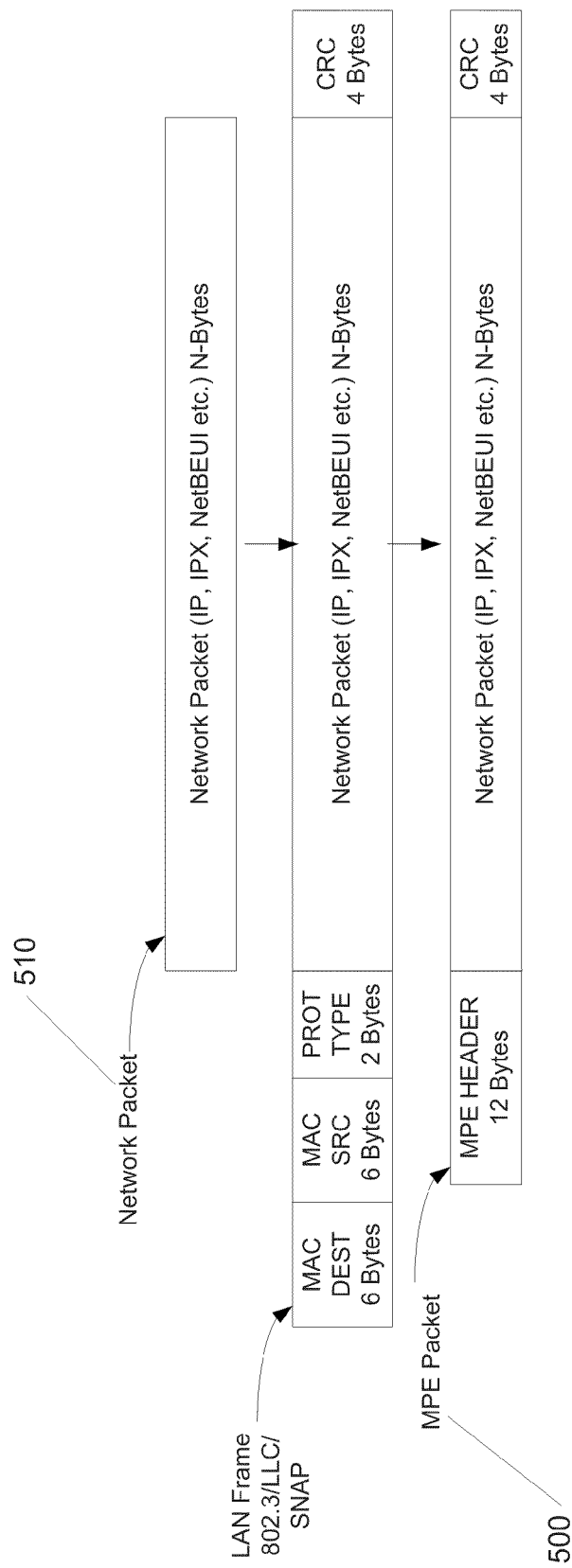
FIG. 5 depicts an implementation of a method of encapsulation of network packet data into an MPE packet for transmission.
Figure 6A:
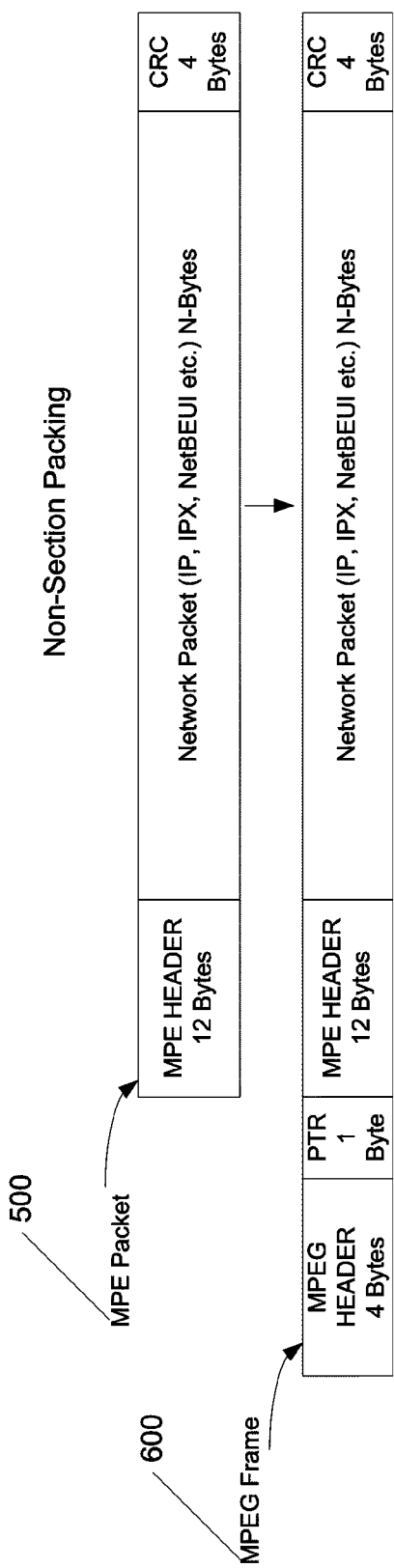
FIGS. 6A-B depict implementations of methods of formatting MPE packets into an MPEG 2 frame for transmission.
Figure 6B:
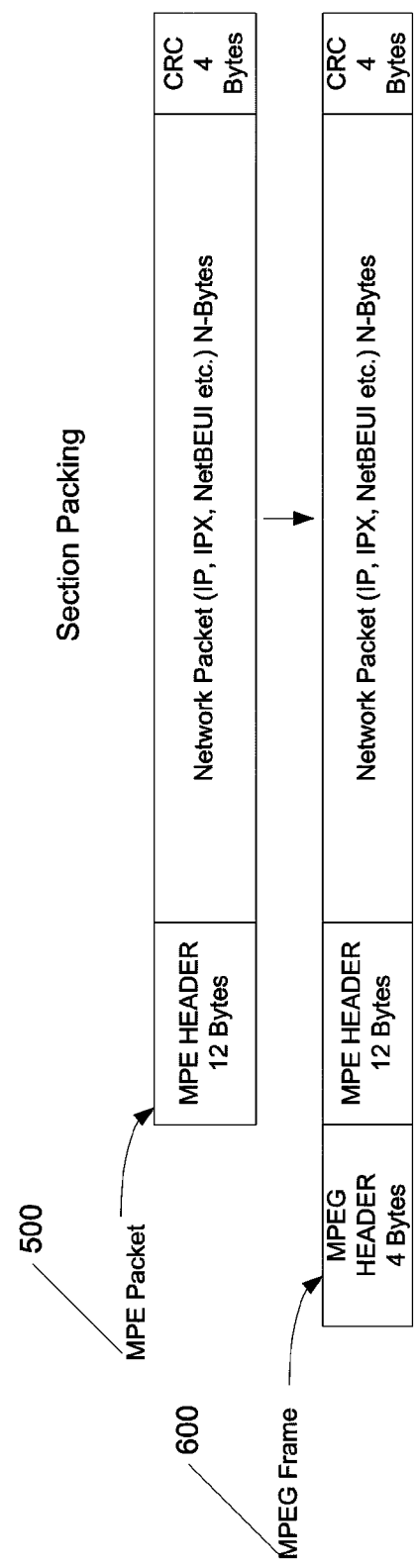
Figure 7:
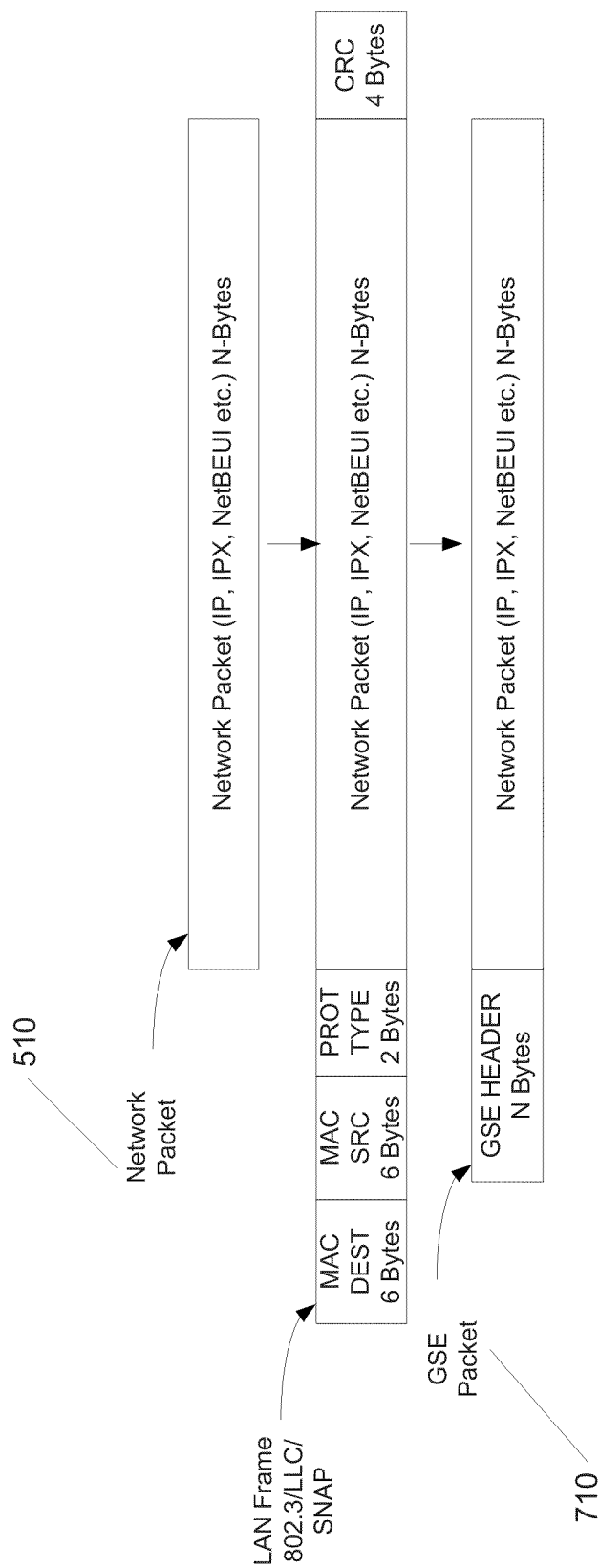
FIG. 7 depicts an implementation of a method of encapsulating network packet data into a GSE packet for transmission.
Figure 8:
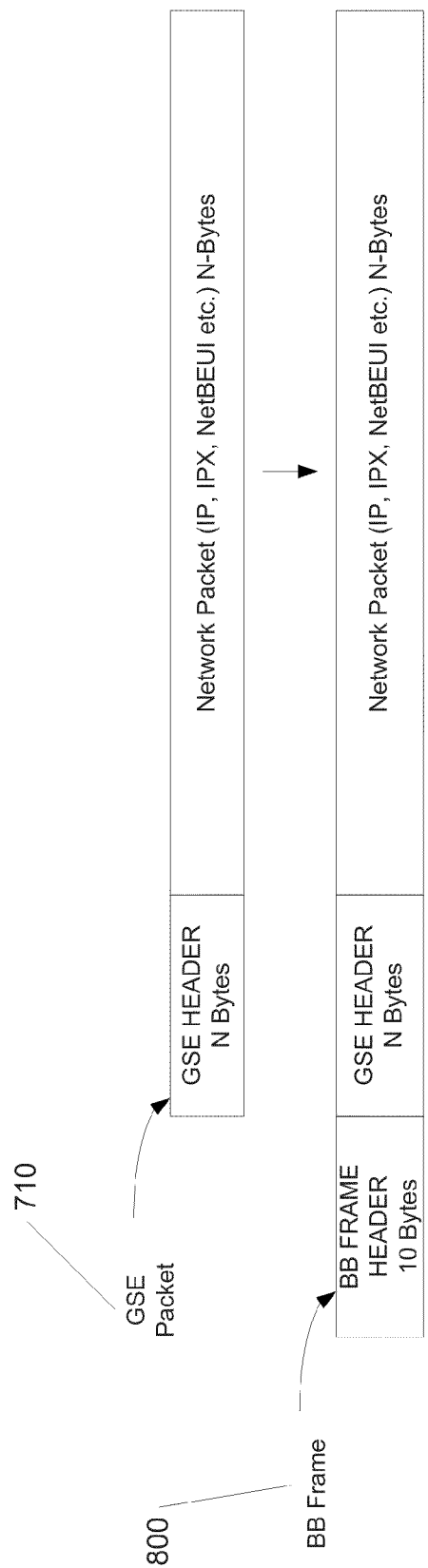
FIG. 8 depicts an implementation of a method of formatting GSE packets into a DVB-S2 BB frame for transmission.

FIGS. 5-8 demonstrate implementations of methods for encapsulation of both MPE and GSE network packet data, however one of ordinary skill in the art would recognize that any other appropriate encapsulation protocol such as, but not limited to Ultra-Lightweight Encapsulation or Unidirectional Lightweight Encapsulation (ULE) may also be used. In particular, FIG. 5 demonstrates the abstraction of serial or packetized network data using MPE encapsulation 500 through a network and FIGS. 6A-B show the framing from MPE 500 to MPEG 2 600 transport stream frames using non-section and section packing, respectively. Additionally, FIG. 7 shows the described methods as used for network data 510 to GSE encapsulation 710, and FIG. 8 depicts the framing from GSE 710 to DVB-S2 Base-Band (BB) frames 800.

The method may be used by first knowing the most basic level of framing for the end-to-end link. For the described method, a network data packet 510, which may be an internet packet (IP), internetwork packet exchange (IPX), NetBIOS Extended User Interface (NetBEUI), or any other appropriate type of packet is encapsulated into an MPE packet 500 and then further framed into a 188-byte MPEG2 transport stream frame 600. Since the MPEG 2 transport stream frame 600 is the most primitive level of framing for the link, the 188-byte frame is considered as the smallest payload to be considered for the described methods. To obtain the true PER of the network, the 188-byte frame must be filled to 100% capacity to ensure the packet loss of only the MPEG 2 transport stream frame layer is calculated to determine the true PER of the network. For an MPE/MPEG 2 network, the encapsulation device supports 188-byte MPEG 2 transport stream frames. The described method may support both section packed transmission configurations (MPE data may start in the middle of an MPEG 2 frame) or non-section packed transmission configurations (where MPE data may only start at the beginning of an MPEG 2 frame) as shown in FIGS. 6A-B, respectively. In either configuration, the 188-byte MPEG 2 transport stream frame 600 is capable of supporting 184 bytes of payload and four bytes are allocated for control information for section packed configurations, and 183 bytes of payload and five bytes of control information. For section packed configurations, the MPE data is constructed to fit 184 bytes of payload. The fifth byte is the 1st byte of the MPE packet as shown in FIG. 6B. For non-section packed configurations, the Payload Start Unit Indicator (PUSI) is automatically set to ensure a fifth byte is enabled, and the result is four control bytes and a fifth byte added as a pointer field. The fifth byte must have an offset of hexadecimal zero (0x00) resulting in the sixth byte being the 1st byte of the MPE packet 500 as shown in FIG. 5. In the non-section packed configuration, the MPE packet 500 is 183 bytes in length. In many MPE/MPEG transmission systems, section packing may be turned off, resulting in a 183 byte payload being used to transmit a frame containing the first section of an MPE packet 500, but in lieu of forcing the transmission system to turn off section packing, the payload may be forced to 184 bytes which will result in an MPE packet 500 fitting within an MPEG 2 transport stream frame 600 for every transmission slot.

FIG. 7 shows another type of encapsulation known as Generic Stream Encapsulation (GSE). GSE is a more efficient type of encapsulation than MPE that may be carried over MPEG 2 transport stream. In a preferred embodiment for a wireless satellite network, the GSE framed packets 710 are provided directly to a DVB-S2 Base-Band (BB) Frame 800. In DVB-S2, the BB frame 800 has a payload that is dependent on several factors such as:

FEC Type: ¼ rate to 9/10 FEC
Frame Size: 16,200 or 64,800 bits

For each DVB-S2 BB frame configuration, the network packet 510 may be different. The described methods may be implemented in an external fashion, but the FEC type and frame size configuration may be fixed to ensure each BB frame 800 is the same during the PER test, however, one of ordinary skill in the art would realize that this is not a requirement. A mechanism may be used to alert a LAN device as to what the available payload size is for optimally packing the BB frame 800 for running the PER test. In a preferred embodiment, the BB frames 800 may be filled with network packets 510 synthetically and injected directly into the BB frame 800 to ensure the BB frame 800 is packed optimally before transmission.

Implementations of the combined methods may determine the overall PER by knowing the total number of packets transmitted and then accounting for the number of erroneous (damaged, lost, out sequence, missing, etc.) packets, and the total PER may be determined without the need for a specific BER or PER test unit as has been required in the prior art.

One of ordinary skill in the art would recognize that the PER performance is determined by the following equation:

PER=Error Packets Received/Total Packets Transmitted

FIG. 9 shows a comparison of an actual PER test using both a synchronous PER tester used in the prior art verses a LAN enabled PER tester using the described method. FIG. 9 shows the actual results using implementations of the described methods in which the output of a synchronous ASI PER tester is compared with the output using the described methods with an external LAN PER data.

The following are provided as non-limiting examples of particular implementations of determining Packet Error Rate (PER) for network data capable wireless communications links:

EXAMPLE 1

A wireless satellite network that supports a LAN connection for network packet data and supports MPE over an MPEG 2 transport stream has a Personal Computer (PC) that generates a fixed number of network packets at a rate that meets the supported payload of the wireless satellite encapsulation and framing system. The MPE encapsulation device has section packing disabled and thus, can support exactly 183 bytes of payload for each MPEG 2 frame. The network packets are set to a length to precisely account for a length such that the 12-byte MPE header and 4-byte CRC may be added to precisely fill a single MPEG 2 frame to 100%. The contents of the network packets are an a priori sequence of changing bytes in the payload and are checked at the distant end by a network enabled PC to ensure they are correct. At the end of the transmission sequence, the total number of bytes transmitted are compared to the number received to determine the total PER obtained through the network. Depending on the quality of the transmission link, the PER verses Es/No may be determined.

EXAMPLE 2

The wireless satellite network described in Example 1 that supports a LAN connection for network packet data and supports MPE over an MPEG 2 transport stream has a Personal Computer (PC) that generates a fixed number of network packets at a rate that meets the supported payload of the wireless satellite encapsulation and framing system. The MPE encapsulation device has section packing enabled, and thus, can support exactly 184 bytes of payload for each MPEG 2 frame. The network packets are set to a length to precisely account for a length such that the 12-byte MPE header and 4-byte CRC may be added to precisely fill a single MPEG 2 frame to 100%. The contents of the network packets are an a priori sequence of changing bytes in the payload and are checked by a network enabled PC at the distant end to ensure they are correct. At the end of the transmission sequence, the total number of bytes transmitted is compared to the number received to determine the total PER obtained through the network. Depending on the quality of the transmission link, the PER verses Es/No may be determined.

EXAMPLE 3

A wireless satellite network that supports a LAN connection for network packet data and supports MPE over an MPEG 2 transport stream synthetically generates a fixed number of network packets at a rate that meets the supported payload of the wireless satellite encapsulation and framing system. The MPE encapsulation device has section packing disabled and thus, can support exactly 183 bytes of payload for each MPEG 2 frame. The network packets are set to a length to precisely account for a length such that the 12-byte MPE header and 4-byte CRC may be added to precisely fill a single MPEG 2 frame to 100%. The contents of the network packets are an a priori sequence of changing bytes in the payload and are checked at the distant end to ensure they are correct by the receiving device. At the end of the transmission sequence, the total number of bytes transmitted is compared to the number received to determine the total PER obtained through the network. Depending on the quality of the transmission link, the PER verses Es/No may be determined.

EXAMPLE 4

The wireless satellite network described in Example 3 that supports a LAN connection for network packet data and supports MPE over an MPEG 2 transport synthetically generates a fixed number of network packets at a rate that meets the supported payload of the wireless satellite encapsulation and framing system. The MPE encapsulation device has section packing enabled and thus, can support exactly 184 bytes of payload for each MPEG 2 frame. The network packets are set to a length to precisely account for a length that the 12-byte MPE header and 4-byte CRC may be added to precisely fill a single MPEG 2 frame to 100%. The contents of the network packets are an a priori sequence of changing bytes in the payload and are checked at the distant end to ensure they are correct by the receiving device. At the end of the transmission sequence, the total number of bytes transmitted are compared to the number received to determine the total PER obtained through the network. Depending on the quality of the transmission link, the PER verses Es/No may be determined.

EXAMPLE 5

A wireless satellite network that supports a LAN connection for network packet data and supports GSE formatted stream over a DVB-S2 transmission link has a Personal Computer (PC) that generates a fixed number of network packets at a rate that meets the supported payload of the wireless satellite encapsulation and framing system. The GSE encapsulation device encapsulates a network packet to fill the GSE frame or frames. The base-band frames may be precisely filled to 100% or partially filled, and the remaining unused payload may be padded to fill up the base-band frame before transmission. The contents of the network packets are an a priori sequence of changing bytes in the payload and are checked at the distant end to ensure they are correct by a network enabled PC. At the end of the transmission sequence, the total number of bytes transmitted are compared to the number received to determine the total PER obtained through the network. Depending on the quality of the transmission link, the PER verses Es/No may be determined.

EXAMPLE 6

A wireless satellite network that supports a LAN connection for network packet data and supports GSE formatted stream over a DVB-S2 transmission generates synthetic data for a fixed number of network packets at a rate that meets the supported payload of the wireless satellite encapsulation and framing system. The GSE encapsulation device encapsulates a network packet to fill the GSE frame or frames. The base-band frames may be precisely filled to 100% or partially filled, and the remaining unused payload may be padded to fill up the base-band frame before transmission. The contents of the network packets are an a priori sequence of changing bytes in the payload and are checked at the distant end to ensure they are correct by the receiving device. At the end of the transmission sequence, the total number of bytes transmitted are compared to the number received to determine the total PER obtained through the network. Depending on the quality of the transmission link, the PER verses Es/No may be determined.

In places where the description above refers to particular implementations of telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A method for generating a packet sequence for determining a Packet Error Rate (PER) using network packets, the method comprising:

generating, using a Local Area Network (LAN) enabled computer, a series of network PER test packets and frames, each packet comprising a predetermined unique identifier and each frame comprising a predetermined sequence for the packets in the series of network packets, wherein the series of network packets and frames are each of a size that is compliant with a predetermined framing mode and encapsulation protocol for the transmission system for determining a PER from the series of network packets and frames;

transmitting, using a transmitting device, the network packets and frames to a receiving device; and notifying the transmitting device of available bandwidth in an encapsulation payload within which an additional LAN enabled payload is carried.

2. The method of claim 1, further comprising identifying the packet and sequence number of the packet using encoded data.

3. The method of claim 2, further comprising determining an integrity of data within the packet using encoded data.

4. The method of claim 1, wherein the framing mode is ISO/IEC 13818-1 Moving Picture Expert Group 2 (MPEG 2) 188-byte transport stream framing.

5. The method of claim 4, wherein the encapsulation protocol is ETSI EN 301 192 Multiprotocol Encapsulation (MPE).

6. The method of claim 1, wherein the framing mode is ETSI EN 307 DVB-S2 base-band framing.

7. The method of claim 6, wherein the encapsulation protocol is Generic Stream Encapsulation (GSE).

8. The method of claim 6, wherein the encapsulation protocol is Ultra-Lightweight Encapsulation or Unidirectional Lightweight Encapsulation (ULE).

9. A system for generating a packet sequence for determining a Packet Error Rate (PER) using network packets, the system comprising:

a Local Area Network (LAN) enabled computer configured to generate a series of network PER test packets and frames, each packet comprising a predetermined unique identifier and each frame comprising a predetermined sequence for the packets in the series of network packets, wherein the series of network packets and frames are each of a size that is compliant with a predetermined framing mode and encapsulation protocol for the transmission system for determining a PER from the series of network packets and frames; and a transmitting device configured to transmit the network packets and frames to a receiving device and to receive notification of available bandwidth in an encapsulation payload in which additional LAN enabled payload is carried.

10. The system of claim 9, wherein the LAN enabled computer is further configured to identify the packet and sequence number of the packet using encoded data.

11. The system of claim 10, wherein the LAN enabled computer is further configured to determine an integrity of data within the packet using encoded data.

12. The system of claim 9, wherein the framing mode is ISO/IEC 13818-1 Moving Picture Expert Group 2 (MPEG 2) 188-byte transport stream framing.

13. The system of claim 12, wherein the encapsulation protocol is ETSI EN 301 192 Multiprotocol Encapsulation (MPE).

14. The system of claim 9, wherein the framing mode is ETSI EN 307 DVB-S2 base-band framing.

15. The system of claim 14, wherein the encapsulation protocol is Generic Stream Encapsulation (GSE).

16. The system of claim 14, wherein the encapsulation protocol is Ultra-Lightweight Encapsulation or Unidirectional Lightweight Encapsulation (ULE).

\* \* \* \* \*